(12) United States Patent
Roderes et al.

(10) Patent No.: US 10,508,947 B2
(45) Date of Patent: Dec. 17, 2019

(54) BODY OF LEVEL GAUGE WITH ELECTRICAL LEAD EXTENDING THERETHROUGH

(71) Applicant: Luxembourg Patent Company S.A., Lintgen (LU)

(72) Inventors: Privat Roderes, Habergy (BE); Jean-Claude Schmitz, Heisdorf (LU)

(73) Assignee: Luxembourg Patent Company S.A., Luxembourg (LU)

( * ) Notice: Subject to any disclaimer, the term of this patent is extended or adjusted under 35 U.S.C. 154(b) by 206 days.

(21) Appl. No.: 15/545,222

(22) PCT Filed: Jan. 14, 2016

(86) PCT No.: PCT/EP2016/050696
§ 371 (c)(1),
(2) Date: Jul. 20, 2017

(87) PCT Pub. No.: WO2016/116355
PCT Pub. Date: Jul. 28, 2016

(65) Prior Publication Data
US 2018/0010947 A1    Jan. 11, 2018

(30) Foreign Application Priority Data
Jan. 22, 2015 (LU) .......................................... 92639

(51) Int. Cl.
*G01F 23/26* (2006.01)
*G01F 23/284* (2006.01)
(Continued)

(52) U.S. Cl.
CPC ............ *G01F 23/26* (2013.01); *G01F 23/263* (2013.01); *G01F 23/266* (2013.01);
(Continued)

(58) Field of Classification Search
CPC ...... G01F 23/26; G01F 23/268; G01F 23/284; G01F 23/263; G01F 23/266;
(Continued)

(56) References Cited

U.S. PATENT DOCUMENTS

| 4,809,129 A | 2/1989 | Hansen, III et al. |
| 5,701,932 A | 12/1997 | Bourscheid et al. |

(Continued)

FOREIGN PATENT DOCUMENTS

| EP | 0650048 A1 | 4/1995 |
| EP | 0709656 A2 | 5/1996 |

(Continued)

OTHER PUBLICATIONS

International Search Report from corresponding International Application No. PCT/EP2016/050696, dated May 2, 2016.

*Primary Examiner* — Randy W Gibson
*Assistant Examiner* — Gedeon M Kidanu
(74) *Attorney, Agent, or Firm* — Sandberg Phoenix & von Gontard P.C.

(57) ABSTRACT

The invention is directed to a gauge body for a container for pressurized gas, comprising a mounting surface for mounting the body to the container; an inner side in contact with the pressurized gas when mounted on the container; an outer side opposite to the inner side with regard to the mounting surface, the outer side being outside of the container when the body is mounted on the container; an electrical lead extending in a gas tight manner through the body from the inner side to the outer side. The electrical lead comprises a metallic rod and a bushing around the rod, the bushing being mounted a gas tight manner on the body.

16 Claims, 2 Drawing Sheets

(51) Int. Cl.
*H01R 13/52* (2006.01)
*H01R 13/622* (2006.01)
*H01R 13/527* (2006.01)

(52) U.S. Cl.
CPC .......... *G01F 23/268* (2013.01); *G01F 23/284* (2013.01); *H01R 13/521* (2013.01); *H01R 13/527* (2013.01); *H01R 13/5221* (2013.01); *H01R 13/622* (2013.01)

(58) Field of Classification Search
CPC .............. H01R 13/5221; H01R 13/527; H01R 13/622; H01R 13/521; H01R 2201/26
See application file for complete search history.

(56) References Cited

U.S. PATENT DOCUMENTS

| | | | |
|---|---|---|---|
| 5,907,112 A * | 5/1999 | Queyquep | G01D 11/24 73/290 R |
| 5,955,684 A | 9/1999 | Gravel et al. | |
| 6,148,681 A | 11/2000 | Gravel et al. | |
| 2005/0101185 A1 | 5/2005 | Gensert et al. | |

FOREIGN PATENT DOCUMENTS

| | | | |
|---|---|---|---|
| WO | 9831077 A1 | 7/1998 | |
| WO | 2013182649 A2 | 12/2013 | |

* cited by examiner

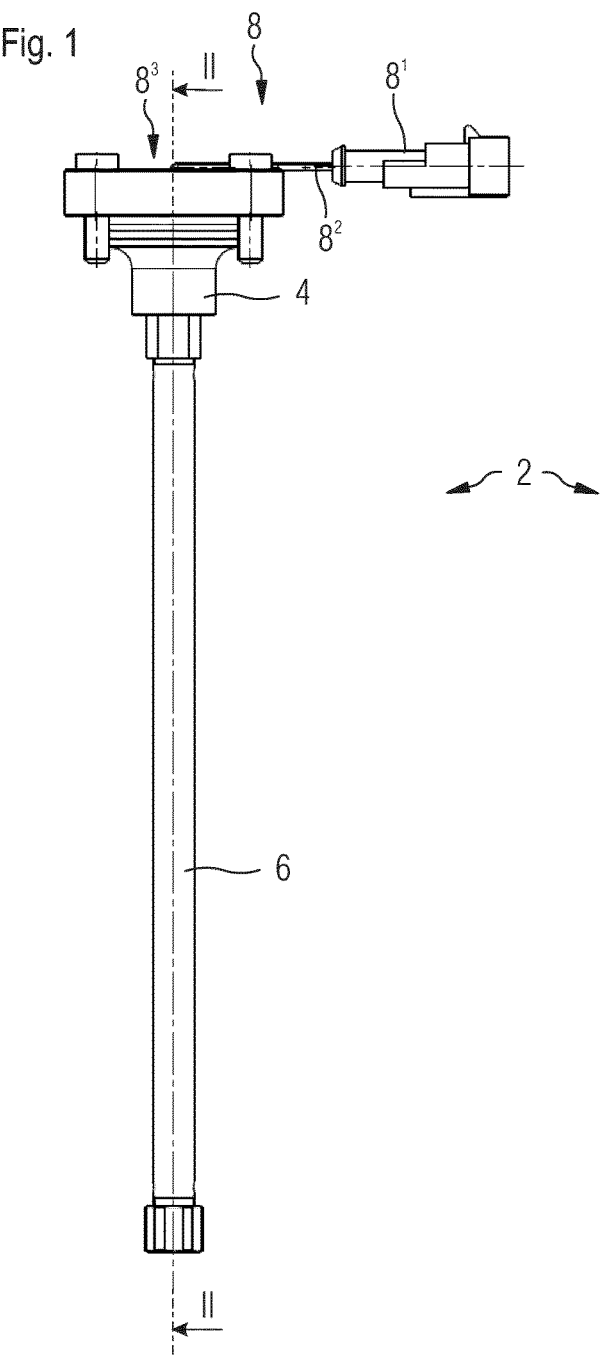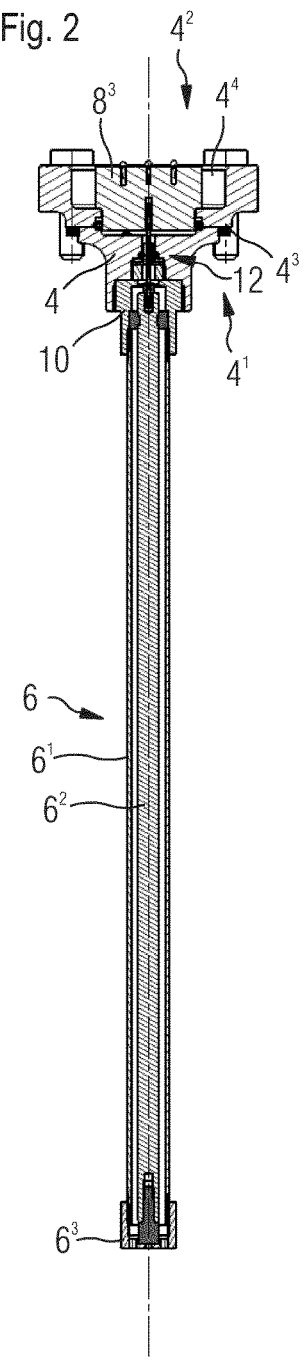

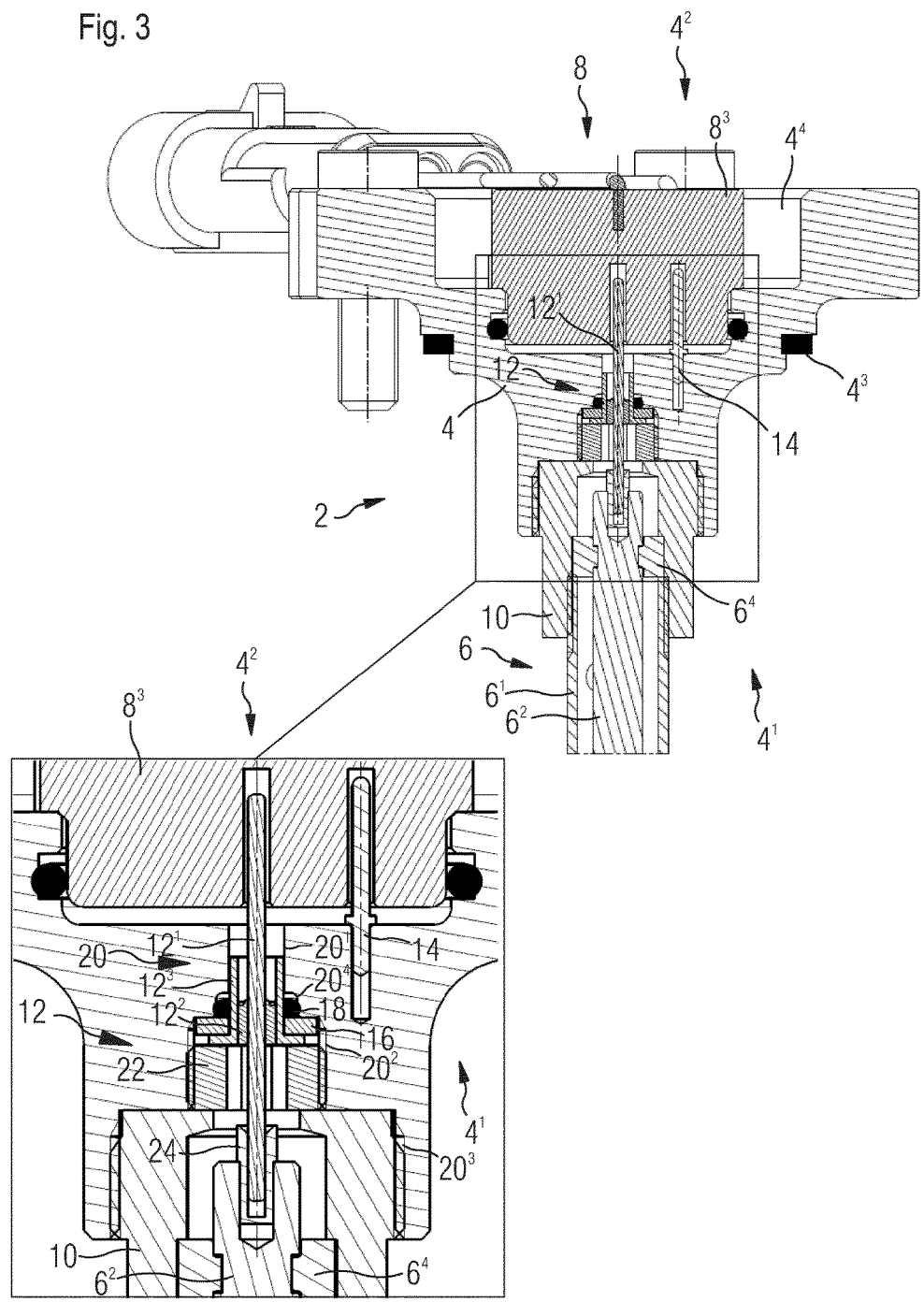

BODY OF LEVEL GAUGE WITH ELECTRICAL LEAD EXTENDING THERETHROUGH

CROSS-REFERENCE TO RELATED APPLICATIONS

The present invention is the US national stage under 35 U.S.C. § 371 of International Application No. PCT/EP2016/050696, which was filed on Jan. 14, 2016, and which claims the priority of application LU 92639 filed on Jan. 22, 2015, the content of which (text, drawings and claims) are incorporated here by reference in its entirety.

FIELD

The invention is directed to the body of a level gauge, in particular for liquefied gas. The invention is also directed to a level gauge comprising the body, the gauge being in various instances of the capacitive type.

BACKGROUND

Prior art patent document published EP 0 709 656 A2 discloses a valve with an integrated level gauge for pressurized gas. It comprises a body to be mounted on a gas container, like gas cylinder, a gas passage extending through the body from a gas inlet to a gas outlet. A capacitive gauge is mounted to the body on an inner side of the body, in contact with the pressurized gas when mounted on the container. The capacitive gauge comprises a tubular electrode and a central electrode extending coaxially through the tubular electrode. The tubular electrode comprises apertures permitting the liquefied gas to also occupy the radial space between the two electrodes, playing the role of a dielectric element of a capacitor. The level of liquefied gas in the container which is therefore also between the two electrodes, determines the average permittivity between the two electrodes and therefore the capacitance of the capacitor. The body comprises an electrical lead that is electrically connected to the central electrode and that extends through the body until an electronic unit that is attached to the body. This document does not however provide any details of how the electrical lead is mounted in a gas tight fashion on the body.

Prior art patent document published WO 2013/182649 A2 discloses a capacitive level gauge for a container of pressurized and liquefied gas. The gauge comprises a tubular electrode and a central electrode extending inside the tubular one. The upper extremity of a central electrode support is fixed to the body of the gauge via gasket. This latter has a beveled shape conforming to a corresponding beveled bore in the body. The beveled bore widens upwardly. The gasket is therefore inserted into the bore on an outer side of the body, i.e. a side of the body that is outside of the container when the gauge is mounted thereon. A nut is screwed on the body so as to compress the gasket axially downwardly, resulting in compressive forces against the central electrode support due to the beveled shape of the gasket and the bore. An electrical wire extends from the upper extremity of the central electrode through the nut until an electrical circuit that is fixed to the body. This teaching is interesting in that it provides an interesting solution for ensuring a gas tight connection between the inner and outer sides of the body of the gauge. It requires however the central electrode support to extend deep into the body in order to fit in the gasket. The positioning of the central electrode support must therefore be carefully done for guaranteeing the expected gas tight connection. The central electrode support is therefore usually mounted first on the body, the central electrode, the external tubular electrode and the electric circuit are then mounted afterwards.

Prior art patent document published WO 98/31077 discloses a modular level gauge that comprises an explosion proof connector and a probe mounted on the connector. The connector comprises a body with a through central passageway and an electrical connection pin extending through the passage. Explosion proof potting material is filled in the passage between the body and the pin so as to provide a gas tight explosion proof barrier. The pin provides two opposite shoulder sections in contact with the potting material so as presumably to avoid any risk of axial relative movement between the pin and the potting material. The probe comprises a single electrode that is electrically connected with the pin by insertion of the pin into a hole in the upper end of the probe. The probe can therefore serve as first electrode of a capacitive gauge, the walls of the container or another distinct probe serving as second electrode of the capacitive gauge. The probe is a conductive cylinder that can be easily coupled to or uncoupled from the connector by means of a modular coupler. The ability of the probe to be easily mounted to, and dismounted from, the connector is quite interesting. The probe is however of the single electrode type. In addition, this teaching fails to provide examples of potting material that can be used.

SUMMARY

The invention has for a technical problem to provide a level gauge body that allows an easy mounting of a capacitive gauge or probe and still provides a satisfying gas tight barrier.

The invention is directed to a gauge body for a container for pressurized gas, comprising: a mounting surface for mounting the body to the container; an inner side in contact with the pressurized gas when mounted on the container; an outer side opposite to the inner side with regard to the mounting surface, the outer side being outside of the container when the body is mounted on the container; an electrical lead extending in a gas tight manner through the body from the inner side to the outer side; wherein the electrical lead comprises a metallic rod and a bushing around the rod, the bushing being mounted in a gas tight manner on the body.

According to various embodiments of the invention, the electrical lead comprises a glass annulus between the metallic rod and the bushing, the annulus forming a gas tight barrier between the rod and the bushing.

According to various embodiments of the invention, the glass annulus is molten on the rod and the bushing so as form the gas tight barrier.

According to various embodiments of the invention, the bushing is housed in a bore of the body, the bore forming a passage between the inner side and the outer side.

According to various embodiments of the invention, the bushing comprises a collar that rests on a shoulder portion of the bore.

According to various embodiments of the invention, the bore comprises a first portion housing the bushing, and a second portion of a larger diameter than the first portion, the shoulder portion being located between the first and second portions, the second portion housing a retainer of the electrode.

According to various embodiments of the invention, the retainer is threaded and engages a female thread formed in the second portion of the bore.

According to various embodiments of the invention, the retainer comprises a central aperture through which the rod of the electrical lead freely extends.

According to various embodiments of the invention, the retainer rests on the collar of the bushing.

According to various embodiments of the invention, the first portion of the bore comprises an annular recess receiving a gasket that contacts the outer surface of the bushing.

According to various embodiments of the invention, the annular recess is adjacent to the shoulder portion of the bore, the gauge body further comprising a washer fitted around the bushing and pressed between the collar of bushing and the shoulder portion, the washer contacting the gasket in the annular recess.

According to various embodiments of the invention, the bore comprises a third portion on a side of the second portion that is opposite to the first portion, the third portion being of a larger diameter than the second portion, the rod extending freely through the third portion.

According to various embodiments of the invention, the third portion of the bore comprises a female thread for holding a tube of a capacitive level sensor.

According to various embodiments of the invention, it comprises a cavity on the outer side for receiving an electronic device, the rod of the electrical lead extending into the cavity.

According to various embodiments of the invention, the cavity comprises a circular inner wall with a groove receiving a gasket.

The invention is also directed to a level gauge for a container of liquefied pressurized gas, comprising: a body to be mounted on the container; a capacitive level sensor attached to the body and for extending inside the container; wherein in that the body is in accordance with the invention.

According to various embodiments of the invention, the capacitive level sensor comprises a tubular electrode and a central electrode extending inside and distant from the tubular electrode so as to allow the liquefied gas to fill the space between both electrodes, the central electrode being electrically connected with the electrical lead of the gauge body.

According to various embodiments of the invention, the central electrode comprises a hole into which the rod of the electrical lead is fitted.

According to various embodiments of the invention, the tubular electrode is attached, in various instances via threaded engagement, to a holding sleeve mounted on the body of the gauge.

According to various embodiments of the invention, the body is in accordance with one of claims 32 and 33, and in that the holding sleeve is in threaded engagement with the third portion of the bore of the gauge body.

The invention is particularly interesting in that it provides a modular gauge body where the electric lead can be easily mounted beforehand in a gas tight fashion on the body. Different types and/or sized of level gauges can be then mounted on the body. The same applies for the electric/electronic interface to be mounted on the opposite side.

DRAWINGS

FIG. 1 is a plan view of a level gauge in accordance with various embodiments of the invention.

FIG. 2 is a sectional view II-II of the level gauge of FIG. 1, in accordance with various embodiments of the invention.

FIG. 3 is an enlarged sectional view of the upper portion of the level gauge of FIGS. 1 and 2, illustrating the body of the gauge and the connection of the capacitive electrodes with the body, in accordance with various embodiments of the invention.

DETAILED DESCRIPTION

FIG. 1 is a plan view of a level gauge device in accordance with various embodiments of the invention. The device 2 comprises a body 4 that is intended to be mounted on a gas tank or container (not illustrated). The body 4 is in various instances made of metallic material like for example steel, stainless steel or brass. The device 2 comprises also a capacitive level sensor 6 that is mounted on the body 4 and intended to extend inside the container, in contact with the liquid or the liquefied gas. The device 2 comprises also an electric or electronic part 8 designed for connecting the capacitive sensor 6 to an external displaying and/or controlling device. The electric/electronic part 8 can comprise a connector $8^1$, electric cables $8^2$ and an interface element $8^3$ housed in a cavity of the body 4 and in electrical connection with the gauge 6.

FIG. 2 is a sectional view II-II of the gauge device of FIG. 1, in accordance with various embodiments of the invention. As is apparent, the body 4 comprises an inner side $4^1$ that is intended to be in contact with the interior of the container, and an outer side $4^2$ that is intended to be outside of the container. The inner and outer sides $4^1$ and $4^2$ are separated by a mounting surface of the body with the container, illustrated by the gasket $4^3$, being understood that any other means of providing a gas tight contact are also possible.

The capacitive level sensor 6 comprises a first external tubular electrode $6^1$ and a second central electrode $6^2$ extending inside and coaxially with the first tubular electrode $6^1$. Both electrodes $6^1$ and $6^2$ are arranged such as to leave an annular space between the two electrodes. This space can be filled by the liquid in the container onto which the device is mounted. Both electrodes and the liquid located in that space form a capacitor. The level of liquid in that space modifies the dielectric value of the capacitor and thereby also its capacitance. This change of capacitance can be detected by electronic means in a manner that is as such known to the skilled person.

As is also apparent in FIG. 2, the lower ends of the two electrodes $6^1$ and $6^2$ are held together in a fixed relative position by means of a holder $6^3$. The upper ends of the electrodes $6^1$ and $6^2$ are fastened to the body 4. The upper end of the first tubular electrode $6^1$ is attached to a holding sleeve 10 that is itself mounted on the body 4. The upper end of the second inner electrode $6^2$ is kept centered inside of the corresponding upper end of the tubular electrode by means of a ring $6^4$. This latter is made of electrically insulating material. It can be made of elastomer.

As is also apparent in FIG. 2, an electrical lead 12 is housed in, and extends through, the body 4. It connects the second inner electrode $6^2$ with the electric or electronic part 8, more particularly with the interface element $6^3$. The details of the electrical lead 12 are better visible in FIG. 3 which will be described here after.

FIG. 3 is an enlarged sectional view of the upper portion of the device of FIGS. 1 and 2. It is to be noted that the section has a different angular orientation as in FIG. 2. FIG. 3 comprises also a blow-up of the central portion of the body, more particular of the electric lead 12.

As is apparent in the main part of FIG. 3, the cavity $4^4$ on the outer side $4^2$ of the body 4 houses the interface element $8^3$ of the electric part 8. A joint or gasket can be provided between the walls of the cavity and the interface element $8^3$ for connecting parts from the outside. The electric lead 12 is a first lead extending into the cavity and into a corresponding hole in the interface element $8^3$. A second lead 14 can extends aside the first lead, the second lead 14 electrically connecting the interface element $8^3$ with the body 4.

As is more apparent in the blow-up part of FIG. 3, the electric lead 12 comprises a rod $12^1$, a bushing $12^3$ and a glass annulus $12^2$ between the rod and bushing. The glass annulus $12^2$ is molted between and on the outer surface of the rod $12^1$ and the inner surface of the bushing $12^3$ so as to hold the rod and bushing together and to form an insulating and gas tight barrier. A clearance or play is therefore provided between the rod and the bushing.

The bushing $12^3$ of the electric lead 12 is housed in a bore 20 of the body 4, the bore forming a passageway between the inner side $4^1$ and the outer side $4^2$ of the body 4. More particularly, the bore 20 comprises a first portion $20^1$ housing the bushing $12^3$. The latter comprises a collar resting on a washer 16 that itself rests on a shoulder portion between the first portion 201 of the bore 20 and a second portion $20^2$ of a larger diameter. The second portion $20^2$ is on a side of the first one $20^1$ that is directed towards the level gauge 6.

The washer can be metallic, elastomeric or a combination of both. It can thereby provide a gas tight connection between the outer surface of the bushing $12^3$ and the bore 20.

The first portion $20^1$ of the bore 20 can comprise an annular groove $20^4$ housing a circular gasket 18, e.g. of the O-ring type, contacting the outer surface of the bushing $12^3$ in a gas tight fashion.

A nut 22 is engaged with the second portion $20^2$ of the bore 20 and exerts a contact pressure on the bushing $12^3$, more particularly on its collar, pushing it against the shoulder portion between the first and second portions $20^1$ and $20^2$ of the bore 20. The nut 22 is annular shaped so as to be void of material in its center, thereby allowing the rod $12^1$ to extend towards the capacitive sensor 6.

More particularly, the rod $12^1$ extends towards the sensor 6 through a third portion $20^3$ of the bore 20; the portion can be of a larger diameter than the second one $20^2$. Similarly to the second portion $20^2$, the third portion $20^3$ of the bore 20 can provide an inner thread. This latter provides then an engagement with a male thread of the holding sleeve 10. This latter holds the ring $6^4$. As is visible in the main part of FIG. 3, this ring $6^4$ is housed in a corresponding bore machined or generally formed inside the sleeve 10 and held in abutment on one side against a shoulder portion of the bore and the other side by the first tubular electrode $6^1$ of the sensor 6. The first tubular electrode $6^1$ can comprise a male thread on its external surface, the thread engaging with a corresponding female thread formed inside the sleeve 10, next to the bore receiving the ring $6^4$.

As is still visible in FIG. 3, as well as in FIG. 2, the ring $6^4$ can comprise an inner rib or annular projecting surface that engages with a corresponding annular groove on the outer surface of the second inner electrode $6^2$ of the sensor. The ring being deformable can then be slid over the inner electrode $6^2$ until its inner annular projecting surface engages with the groove. The inner electrode $6^2$ can then be inserted into the holding sleeve 10 until the ring $6^4$ engages the corresponding bore and abuts against the above mentioned shoulder of the bore. The first annular electrode $6^1$ can then be slid over the second inner electrode $6^2$ and be screwed on the sleeve 10 so as to retain the ring $6^4$ in the sleeve. The holder $6^3$ (see FIG. 2) can then be mounted in order to attach to each other the respective lower ends of the two electrodes $6^1$ and $6^2$. The holding sleeve 10 is in various instances made of metal in order to provide an electrical contact between the tubular electrode $6^1$ and the body 4.

The inner electrode $6^2$ comprises at its upper end face a blind hole receiving the rod $12^1$ of the electric lead 12. A deformable clip 24 can be provided between the hole and the rod, the clip providing an increased contact pressure at some locations and thereby an improved electrical contact. It can also be elastic to constantly provide a contact pressure irrespective of vibrations, thermal contraction and/or expansion of the rod and/or the electrode.

During assembly of the level gauge device, the electric lead 12 can be mounted on the body 4, thereby providing a modular body for different gauge devices. Different types and/or sizes of level sensors can then be mounted on the inner side of the body. Similarly, different kinds of electric parts and/or electric interfaces can be mounted on the outer side of the body. The level gauge must not necessarily comprise two concentric electrodes but can also comprise a single electrode.

The invention claimed is:

1. A gauge body for a container for pressurized gas, said gauge comprising:
   a mounting surface for mounting the body to the container;
   an inner side in contact with the pressurized gas when mounted on the container;
   an outer side opposite to the inner side with regard to the mounting surface, the outer side being outside of the container when the body is mounted on the container;
   an electrical lead extending in a gas tight manner through the body from the inner side to the outer side;
   wherein, the electrical lead comprises a metallic rod and a bushing around the rod, the bushing being mounted in a gas tight manner on the body;
   wherein the electrical lead comprises a glass annulus between the metallic rod and the bushing, the glass annulus forming a gas tight barrier between the rod and the bushing;
   wherein the bushing is housed in a bore of the body, the bore forming a passageway between the inner side and the outer side;
   wherein the bushing comprises a collar that rests on a shoulder portion of the bore; and
   wherein the bore comprises a first portion housing the bushing, and a second portion of a larger diameter than the first portion, the shoulder portion being located between the first and second portions, the second portion housing a retainer of the electrode.

2. The gauge body according to claim 1, wherein the glass annulus is molten on the rod and the bushing so as form the gas tight barrier.

3. The gauge body according to claim 1, wherein the retainer is threaded and engages a female thread formed in the second portion of the bore.

4. The gauge body according to claim 1, wherein the retainer comprises a central aperture through which the rod of the electrical lead freely extends.

5. The gauge body according to claim 1, wherein the retainer rests on the collar of the bushing.

6. The gauge body according to claim 1, wherein the first portion of the bore comprises an annular recess receiving a gasket that contacts the outer surface of the bushing.

7. The gauge body according to claim 6, wherein the annular recess is adjacent to the shoulder portion of the bore, the gauge body further comprising a washer fitted around the bushing and pressed between the collar of the bushing and the shoulder portion, the washer contacting the gasket in the annular recess.

8. The gauge body according to claim 1, wherein the bore comprises a third portion on a side of the second portion that is opposite to the first portion, the third portion being of a larger diameter than the second portion, the rod extending freely through the third portion.

9. The gauge body according to claim 8, wherein the third portion of the bore comprises a female thread for holding a tube of a capacitive level sensor.

10. The gauge body according to claim 1, wherein the gauge body comprises a cavity on the outer side, for receiving an electric interface, the rod of the electrical lead extending into the cavity.

11. The gauge body according to claim 10, wherein the cavity comprises a circular inner wall with a groove receiving a gasket.

12. A level gauge for a container of liquefied pressurized gas, said gauge comprising:
- a body to be mounted on the container;
- a capacitive level sensor attached to the body and for extending inside the container;
- wherein the body comprises:
  - a mounting surface for mounting the body to the container;
  - an inner side in contact with the pressurized gas when mounted on the container;
  - an outer side opposite to the inner side with regard to the mounting surface, the outer side being outside of the container when the body is mounted on the container; and
  - an electrical lead extending in a gas tight manner through the body from the inner side to the outer side; and
- wherein the electrical lead comprises a metallic rod and a bushing around the rod, the bushing being mounted in a gas tight manner on the body;
- wherein the electrical lead comprises a glass annulus between the metallic rod and the bushing, the glass annulus forming a gas tight barrier between the rod and the bushing;
- wherein the bushing is housed in a bore of the body, the bore forming a passageway between the inner side and the outer side;
- wherein the bushing comprises a collar that rests on a shoulder portion of the bore; and
- wherein the bore comprises a first portion housing the bushing, and a second portion of a larger diameter than the first portion, the shoulder portion being located between the first and second portions, the second portion housing a retainer of the electrode.

13. The level gauge according to claim 12, wherein the capacitive level sensor comprises a tubular electrode and a central electrode extending inside and distant from the tubular electrode so as to allow the liquefied gas to fill the space between both electrodes, the central electrode being electrically connected with the electrical lead of the gauge body.

14. The level gauge according to claim 13, wherein the central electrode comprises a hole into which the rod of the electrical lead is fitted.

15. The level gauge according to claim 13, wherein the tubular electrode is attached via threaded engagement to a holding sleeve mounted on the body of the gauge.

16. The level gauge according to claim 15, wherein the bore comprises a third portion on a side of the second portion that is opposite to the first portion, the third portion being of a larger diameter than the second portion, the rod extending freely through the third portion, wherein the holding sleeve is in threaded engagement with the third portion of the bore of the gauge body.

* * * * *